Figure 1:
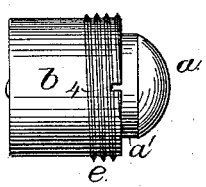

(No Model.)

P. FORG.
SPRING BOLT.

No. 308,887.  Patented Dec. 9, 1884.

Witnesses,
John F. C. Prunkert
Fred A. Powell

Inventor:
Peter Forg
by Crosby & Gregory attys.

UNITED STATES PATENT OFFICE.

PETER FORG, OF SOMERVILLE, MASSACHUSETTS.

SPRING-BOLT.

SPECIFICATION forming part of Letters Patent No. 308,887, dated December 9, 1884.

Application filed September 26, 1882. Renewed October 2, 1884. (No model.)

*To all whom it may concern:*

Be it known that I, PETER FORG, of Somerville, county of Middlesex, State of Massachusetts, have invented an Improvement in Catches, of which the following description, in connection with the accompanying drawings, is a specification.

My invention relates to a spring-bolt for holding doors of cabinets, or for holding sliding sashes, or other similar purposes, it operating in substantially the same manner as the spring-bolt for which Letters Patent No. 256,559 were granted to me April 18, 1882, to which reference may be had. The said patented fastening consists of a bolt having a rounded or conical end contained in a cylindrical case and acted upon by a spring tending to throw the end of the bolt out from the case, the said bolt being made adjustable on a shank or threaded stud, so as to govern the amount that it projects beyond the end of the case, to thus compensate for shrinkage or swell of the doors or articles for which it is employed.

The present invention has for its object to simplify the construction, enabling catches or spring-bolts to be produced at a much lower cost. The inclosing-case for the spring-bolt in my present, as in my former, invention is made cylindrical and of a size corresponding to the standard size of augers or boring-tools, so that the bolt may be inserted in a hole or mortise made by simply boring with an auger or bit. In the present invention the spring-bolt and its shank is of the construction similar to the ordinary brass-headed furniture tacks or nails, from which the said bolts may be made by merely operating upon the heads of the said tacks by a machine invented by me for this purpose, upon which I intend to procure Letters Patent. The said bolt consists of a rounded or conoidal head formed of a shell of malleable brass or equivalent sheet metal, and attached to a stem or shank of malleable iron. The edges of the said head are drawn into a cylindrical shape, so as to slide freely in the interior of the inclosing-case, which is made of cast metal. The shank of the bolt passes through a guide-passage in the end of the said case, where it is upset or headed to prevent the bolt from being thrown wholly out of the casing by the spring which surrounds the said shank and bears at one end against the inside of the said bolt-head, and at the other end against the inside of the said casing. The bolt-head thus always projects a definite distance beyond the end of the casing, and in order to adjust its amount of projection relative to the door, so as to compensate for swelling or shrinkage, as in my former invention, the casing itself is provided with an external thread projecting beyond the unthreaded cylindrical portion, and being of sufficient hardness to cut itself a thread in the wood into which the entire fastening device is inserted, so that by rotating the entire case it may be caused to project a greater or less distance from the door or other article in which it is used. The said casing is provided with a suitable slot to enable it to be rotated by a screw-driver of proper construction.

Figure 2:
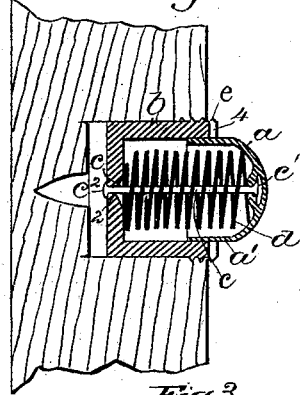
Figure 3:
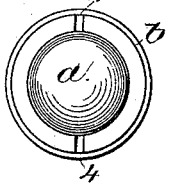

Figure 1 is a side elevation of a fastening-catch embodying this invention; Fig. 2, a longitudinal section thereof, showing it as mounted in the material of a door, sash, or other article to be fastened; and Fig. 3, a front elevation thereof.

The bolt $a$ consists of a thin shell of malleable metal—such as sheet-brass commonly employed for ornamental furniture-nails—the end of the said bolt being rounded or conoidal in shape, and its edges being drawn in suitable dies to a cylindrical shape, as shown at $a'$, fitted to slide freely within the case $b$, which is preferably made of a cast-metal composition.

The shank $c$ of the bolt $a$ consists of the usual stem of malleable iron, having a head, $c'$, at one end embedded in the metal of a bolt, $a$, as shown, the said bolt and shank being made in the same manner as the usual furniture-nails, or being made directly from the said manufactured nails. The said shank $c$ is surrounded by the spring $d$, bearing at one end against the inside of the bolt $a$, which, with the said spring, is inserted in the casing $b$, the said shank $c$ passing through a hole, 2, in the bottom of the said casing, and being then upset or provided with a head, $c^2$, which limits the outward movement of the bolt $a$ from the case $b$ under the action of the spring $d$.

In order to facilitate the insertion of the shank $c$ of the bolt $a$ into the hole 2 in the case in the process of manufacturing the catches, the inside of the case is countersunk around the said hole 2, as shown in Fig. 2, thus easily guiding the end of the shank through the said hole in the process of putting the parts together before the said shank is provided with a head $c^2$.

The external diameter of the casing $b$ is of proper size to fit in a hole bored by a standard-sized auger or bit in the wood, as shown in Fig. 2, and it is provided with a screw-thread, $e$, made in the process of casting, and projecting beyond the smooth unthreaded portion of the casing, as shown, so that when the said casing is inserted in the auger-hole and rotated, the said thread will cut its way into the hole after the manner of the usual wood-screw.

The casing is provided with a slot, 4, which may be engaged by a screw-driver forked to embrace the head of the bolt $a$ when projecting, as shown in Fig. 2, or an ordinary screw-driver may be employed to engage the said notch and turn the casing $b$ into its socket, the middle portion of the screw-driver then forcing the bolt deeply into the casing. By turning the casing in one direction or the other it will by the threads be drawn farther into its socket or moved farther out, so as to adjust the amount of projection of the end of the bolt beyond the door or other article in connection with which it is used to thus compensate for swelling or shrinking.

I claim—

The bolt consisting of a thin metallic shell having rounded and cylindrical portions and a shank, combined with a casing having a countersunk opening to receive the end of the said shank, and a spring surrounding the said shank and interposed between the bolt and the casing, the end of the shank being upset or headed to engage the casing, substantially as and for the purposes described.

In testimony whereof I have signed my name to this specification in the presence of two subscribing witnesses.

PETER FORG.

Witnesses:
 Jos. P. Livermore,
 B. J. Noyes.